Sept. 9, 1952            R. H. DAVIES            2,609,829
EMERGENCY BY-PASS VALVE FOR FLUID CIRCUITS
Filed Oct. 27, 1947            2 SHEETS—SHEET 1
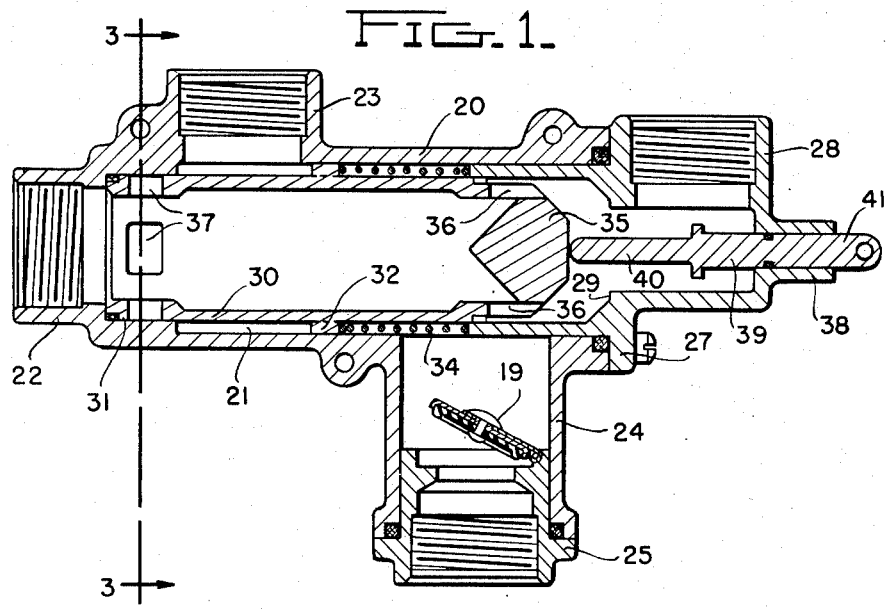
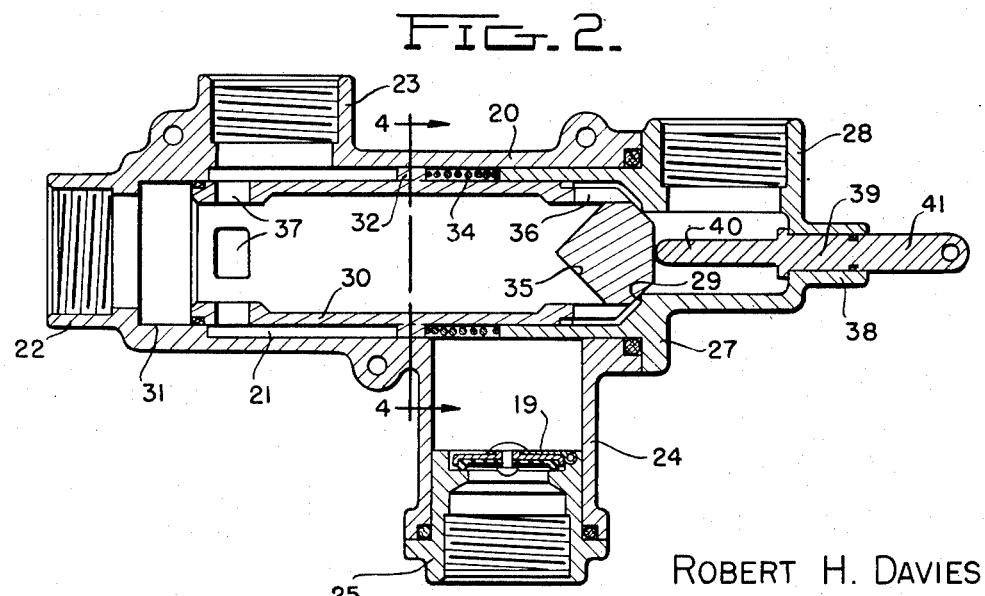
ROBERT H. DAVIES
*INVENTOR.*
BY
*ATTORNEYS*

Sept. 9, 1952 R. H. DAVIES 2,609,829
EMERGENCY BY-PASS VALVE FOR FLUID CIRCUITS
Filed Oct. 27, 1947 2 SHEETS—SHEET 2
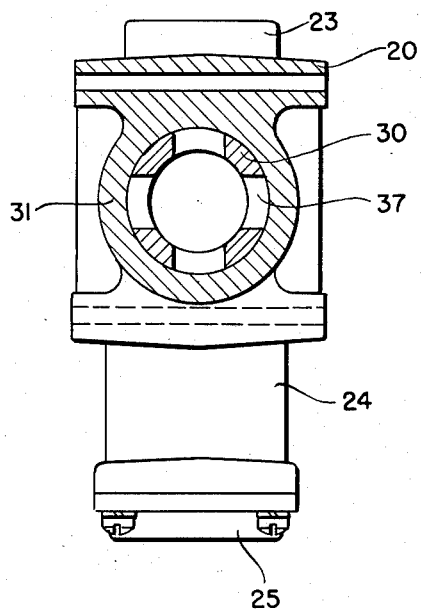
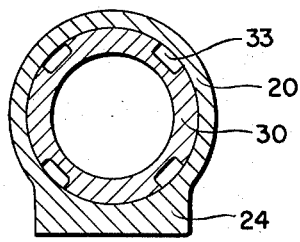
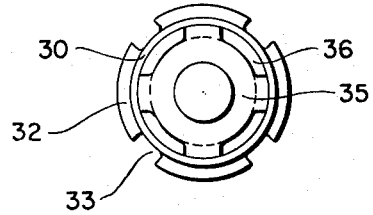
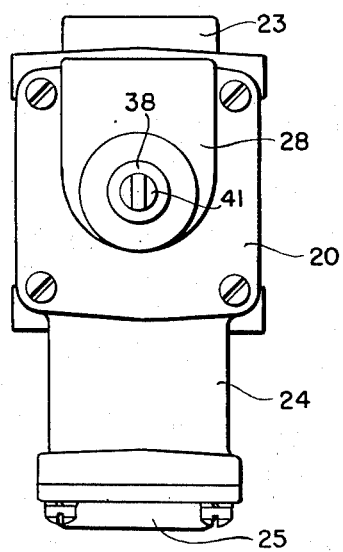
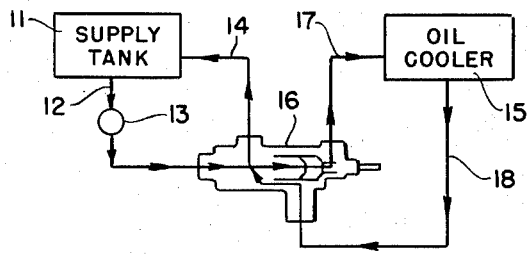
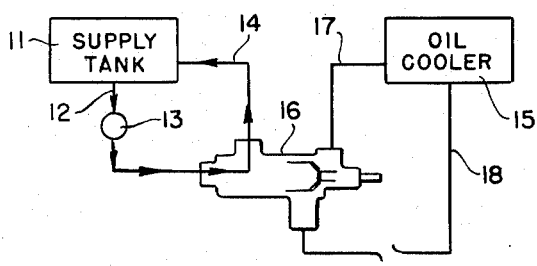
ROBERT H. DAVIES
*INVENTOR.*
BY
Mason, Porter, Diller & Stuart
*ATTORNEYS*

Patented Sept. 9, 1952

2,609,829

UNITED STATES PATENT OFFICE 2,609,829

EMERGENCY BY-PASS VALVE FOR FLUID CIRCUITS

Robert H. Davies, Aurora Township, Portage County, Ohio, assignor to The Parker Appliance Company, Cleveland, Ohio, a corporation of Ohio Application October 27, 1947, Serial No. 782,381

15 Claims. (Cl. 137—117)

The following specification sets out in detail an invention in an emergency by-pass valve adapted to arrest the delivery of fluid under pressure and to return it to its source whenever there is an abnormal pressure differential in the flow of the fluid in the delivery circuit. This arrangement is of value for fluid circuits for cooling the oil in airplanes, for brake operating circuits and other work circuits and similar equipment. Applying more particularly to a circuit in which oil is drawn from a supply tank, delivered to a cooler or analogous exchange heat device and returned to the tank, an emergency may arise especially in aviation where the normal flow of the liquid under pressure is disrupted by a break in the work circuit to and from the cooler. When this happens, the pump in its continued operation may cause material loss and danger unless some means is provided for stopping the discharge.

One of the objects of my invention is to provide means for cutting off that portion of the circuit which includes the cooling or other heat exchange means or work circuit and diverting or by-passing the flow under normal pumping pressure directly back to the supply tank.

A further object of my invention is to effect the stoppage of normal flow and to by-pass the liquid immediately on the occurrence of an abnormal pressure differential and without the intervention of external operating means.

I have also designed the invention to provide for resetting the valve means and restoring normal supply of the pressure liquid whenever the relative pressure drops can be restored.

Other objects of my invention will be readily apparent from the following description of my preferred embodiment as illustrated in the accompanying drawings in which:

Fig. 1 is a vertical longitudinal sectional view of the valve in opened position;

Fig. 2 is a similar sectional view of the valve in closed position;

Fig. 3 is a vertical transverse sectional view of the valve parts taken on the line 3—3 of Fig. 1;

Fig. 4 is a similar sectional view of the valve parts taken on the line 4—4 of Fig. 2;

Fig. 5 is an end view of the shuttle;

Fig. 6 is an end view of the device;

Fig. 7 is a diagrammatic view of the fluid flow through the valve during operation with normal pressure drop and Fig. 8 is a similar view when the fluid flow through the valve and into the receiving circuit is changed due to disruption of that circuit.

Generally described the invention resides in a work circuit actuated by fluid flow controlled by a cut-off and by-pass valve sensitive to differences between pressure drops. This pressure drop, in turn, is a function of the velocity of the fluid. The total pressure drop across the valve is the sum of both frictional pressure and velocity pressure. The valve is designed to respond to the drop in pressure of fluid as it traverses the valve poppet in the outgoing direction, and also to the drop in pressure of fluid as it traverses the valve poppet in the returning direction, and valve actuation is effected when a differential is established in the two pressure drops.

A specific embodiment of my invention has been illustrated solely by way of example as applied to a system for cooling the oil in the supply tank of an airplane or the like. Under normal operation the oil is pumped from the supply tank to the cooler and back to the supply tank. The novel valve is interposed in the circuits so that it is affected by both the discharge flow and the return flow. There is a calculated pressure drop for the flow through the valve in each direction conditioned on the maintenance of normal pumping rate (volume) and velocity. Where the pressure drop in the return direction is decreased relatively to the pressure drop in the discharge direction as by rupture of the work circuit and consequent leakage, the valve is caused to close and by-pass the input flow to the return pipe.

Although closing movement of the valve is caused by the differential in the two pressure drops acting across the poppet, when once closed there is no flow in either direction to and from the oil cooler circuit and hence no pressure drop across the poppet. There is, however, a seating pressure applied to the poppet by the pressure of the fluid circulating from the inlet pipe directly to the return pipe. Although this will ordinarily be a low pressure, it will be sufficient to keep the valve seated, even against the action of the light spring when the latter is used. Thus, the pump can continue to operate to supply parallel circuits without the danger of losing all the fluid for the entire system because of the leak in the one branch.

When the spring is used, it will reopen the valve to normal operating position upon the shutting off of the pump and the consequent complete loss of pressure in the inlet pipe. Under normal practice, pumping will not be resumed until the leak has been repaired, although if it should, the differential in pressure drops across the poppet in the opposite directions will again function to close the valve.

When no spring is used, the valve remains closed until opened by the reset rod, and obviously the valve can then be opened at the will of the operator and regardless of whether the pump has been stopped or started or whether or not the leak has been repaired.

I have shown diagrammatically in Figs. 7 and 8 a supply tank 11 for oil or similar fluid under pressure. A discharge pipe 12 draws from the supply tank 11. The discharge pipe 12 includes a liquid circulating pump 13 by which the discharge is maintained under the desired normal pressure.

A return pipe 14 is also connected to the supply tank and delivers liquid also to the supply tank after it has been used or treated.

An oil cooler 15 or similar circuit receiving oil from the discharge pipe 12 is provided. The oil from the discharge pipe 12, however, must first pass through an emergency valve 16. This valve operates as a by-pass and serves on sudden pressure drop through the valve in the return direction from the cooling circuit, to return the incoming oil flow through pipe 14 to the source.

The oil cooler or other heat exchange device is connected by input pipe 17 with the valve mechanism 16. A return pipe 18 also leads from the oil cooler to the valve 17.

A suitable check valve 19 (see Figs. 1 and 2) forms part of the valve mechanism 16 and prevents reverse flow in the return pipe 18.

Generally considered, the emergency valve 16 and its pipe connections supply 2-way delivery of the oil under pressure. In one direction the oil from the circulating pump 13 is delivered to the cooler 15 and in the other direction by the return pipe 18 the cooled oil passes through the valve mechanism and return pipe 14 to the supply tank.

Such being the normal operation of the valve, the fluid flow in both branches is the same. However, if there is a break in the piping 17, 18, for example as shown in Fig. 8, momentary loss of liquid and consequent altered pressure drop through the valve in the return direction, serves to unbalance the open valve mechanism 16 and close it. This is followed by by-passing or diverting the discharge from the pump 13 directly back to the supply tank 11 through return pipe 14. To accomplish this desired result the valve 16 has been especially designed. The device consists primarily of a valve casing 20. This casing has a horizontal chamber or bore 21. At one end the chamber terminates in an inlet fitting 22 which is screw-threaded to receive the pipe 12.

The upper part of the casing 20 includes an outlet fitting 23. This is also screw-threaded or otherwise provided to receive the return pipe 14 leading to the supply tank. The lower portion of the casing 20 has an outlet port 24. This has a separable fitting 25 by which it may be connected to the return pipe 18 from the cooling mechanism. The fitting 25 supports the check valve 19 of ordinary type by which reverse flow in the return pipe 18 is prevented.

The end of the casing 20 opposite the fitting 22 is provided with a sleeve member 27. This fits within the bore 21 and reduces the effective diameter at this end. The sleeve member 27 terminates in a screw-threaded fitting 28 by which operative connection is provided for the input pipe 17 to the oil cooler.

The sleeve member 27 has an intermediate restriction which forms a valve seat 29.

The single movable operating member of the valve is a poppet 30. The poppet has a sliding bearing within the reduced bore 31 adjacent the inlet fitting 22.

At the opposite end the poppet slides easily within the sleeve 27 as shown in Fig. 1.

The outer surface of the poppet 30 is extended at an intermediate point to provide a web or flange 32. This web is mutilated or interrupted as shown in Fig. 4 to provide ducts or passages 33 by which the liquid under pressure may travel from the inlet port 24 to the return outlet fitting 23, traversing the chamber 21.

A spiral compression spring 34 has its opposite ends resting upon web 32 and the end of the sleeve 27. Thus the poppet 30 is normally held in the left-hand position as shown in Fig. 1 with the end of the poppet resting against the inner wall of the fitting 22.

The poppet is centrally bored to provide a longitudinal passageway leading from the fitting 22. At the opposite end the poppet is tapered to form a conical valve head 35. This engages the valve seat 29 as shown in Fig. 2.

Diagonal vents 36 are provided between the valve head 35 and the side wall of the poppet. These provide for ready escape of the liquid under pressure when the valve is in the open position as shown in Fig. 1.

At its opposite end the poppet has a series of radial ports 37. These rest against the surface of the restricted bore 31 of the casing when the valve is in open position. However, when the valve is closed as shown in Fig. 2, these ports are opposite the return fitting 23 into which they discharge through the bore 21.

During the normal operation the liquid flows under pressure longitudinally through the open valve and out through fitting 28 as shown in Figure 1, and is delivered to the oil circuit. As this outgoing liquid traverses the interior passage and the diagonal ports 36 of the poppet, there is a drop in the pressure of the fluid whereby the pressure of the fluid as it leaves the valve poppet is somewhat less than the pressure when it enters. This drop in pressure is dependent on the velocity of the fluid and is independent of the actual pressure of the liquid. A seating force is applied to the poppet by this outgoing fluid which is proportional to this pressure drop.

After passing through the oil cooling unit, the fluid is returned through the fitting 25 and passageway 24 into the chamber 21 on the right hand side of the web 32. The fluid then passes through the web passages 33 and out through port 23 to the return pipe 14. The passages 33 are so proportioned that the drop in pressure of the fluid as it passes therethrough at any given flow rate will be substantially equal to the drop in pressure of the outgoing fluid as it passes through the bore and ports 36 of the poppet at the same flow rate. The returning fluid will thus act upon the web 32 tending to keep the poppet in open position with a force proportional to the drop in pressure of the fluid passing therethrough. Thus, when fluid is passing through the valve in both directions at any given single flow rate, the opening and closing forces upon the poppet due to the fluid are substantially balanced and the valve will remain open.

In the event that the oil cooling circuit 17, 18, is broken to occasion a loss of fluid therefrom, there will be less fluid returning through the web passages 33 than is going out through the ports 36, and hence the velocity of the returning fluid will become lessened through the passages 33 but will remain the same through the ports 36. This differential in velocity effects a differential in the pressure drops acting upon the poppet, and since the pressure drop in the return direction is now lower than that in the outgoing direction, the poppet will close, thus cutting off the discharge to the oil cooling circuit.

In the event that the oil cooling circuit 17 and 18 is broken, there is an immediate loss of liquid and consequently the pressure drop in the return stream in chamber 21. This unbalances the pressure on the opposite sides of the poppet 30. Since the incoming pressure through fitting 22 is greater, it overcomes the spring 34 and causes the poppet to slide to the position shown in Fig. 2 in which the valve head 35 rests upon the valve seat 29 and thus cuts off discharge to the cooling circuit.

At the same moment the check valve 26 is closed by the liquid under pressure and return flow through pipe 18 is prevented.

Movement of the poppet to the right into closed position brings radial ports 37 into position below the fitting 23. Thus they discharge the liquid under pressure freely into the chamber 21 from which it is delivered by return pipe 14 to the supply tank.

Continued operation of the circulating pump causes the circulation of the oil from the supply tank through discharge pipe 12 in the left hand portion of the valve 16 and back through the return pipe 14 to the supply tank. In this situation there is no discharge of liquid from the valve 16 through either pipe 17 or 18. It will be understood that stoppage of the pump allows the spring 34 to move the poppet 30 into open position. Assuming that the leak in the oil cooler circuit has been repaired and the system properly primed and bled of air, restarting of the pump will cause the fluid to circulate in a normal manner, since the valve will remain in open position due to the fact that fluid will again traverse the poppet in the return direction at the same rate as in the outgoing direction and the opposite pressure drops are again balanced.

The sleeve member 27 has a longitudinal axial boss 38. This forms a sliding journal for a plunger 39. The plunger 39 extends within the fitting 27 with the projection 40 reaching to within a short distance of the valve head 35 when the valve is closed. The opposite end 41 of the plunger 39 extends outside of the boss 38. The plunger thus may be operated manually or connected to mechanism by which it may be operated mechanically or electrically. The plunger 40 is normally out of contact with the closed poppet. However, when it is desired to restore flow through the cooling unit by opening the valve, the plunger is moved to the left and thus lifts the poppet away from its seat as shown in Fig. 1.

If a leak of predetermined proportions occurs in any part of the circuit between the by-pass and the oil cooler, all of the fluid delivered from the supply tank will not be returned through the by-pass valve. Because of the reduced return flow the pressure drop across the web 32 tending to hold the valve poppet open will be reduced to a point where the closing tendency will become dominant and the valve poppet will close against the seat 29, thus isolating the portion of the valve cooler circuit beyond the by-pass valve. The ports 37 will then come into register with the valve chamber 21 and the supply fluid will pass therethrough into the outlet 23 and back again to the supply tank. Fluid within chamber 21 will be prevented from entering the oil cooler circuit by means of the check valve 19.

Pressure drop is a function of fluid velocity and orifice characteristics. In this valve it is desirable that the pressure drops in the opposite direction bear the same relation to each other for all flow rates within the selected operating range as this will allow maximum sensitivity and uniformity of operation throughout the range. The ideal condition is to have the incoming and returning pressure drops perfectly balanced at all of the flow rates involved, in other words to have the pressure drop curves for the incoming and return flows congruent. With this condition the sensitivity of the valve does not vary from low to high flow rates.

When the spring 34 is used the valve is so proportioned that the pressure drop in the opening direction is equal to or even slightly less than the pressure drop in the closing direction. The spring will then make up for this slight difference to keep the poppet in a normally open position. If the spring is omitted, there must be a slight over-balance in the two pressure drops effective for keeping the valve open while in normal operation. Either with or without the spring it is desirable to have the total balance in the opening direction only slightly larger than that in the closing direction so that it will require only a small leak to reduce the quantity of returning fluid to the point where sufficient overbalance is obtained in the opposite direction for closing the valve.

The use of a spring may be optional depending upon the particular installation. If it is desired that the valve be self opening after a leak in the oil circuit has been repaired, the spring will provide this effect. On the other hand, it may be more desirable to provide a positive mechanical means such as the plunger 40 for opening the valve. In some cases it may be desirable to utilize both.

As indicated, the valve has been designed primarily for use in the oil cooling system of an airplane for preventing the loss of the oil in the event of a leak occurring in the oil cooler circuit. This is of special importance in combat airplanes where part of the circuit may be shot away by gun fire. It is obvious, however, that the valve could be used in many other places to prevent the loss of fluid in the event of leakage occurring in part of a hydraulic or other fluid circulating system.

The mechanism and arrangement of parts which has been described above in detail, provides for promptly checking the loss of fluid due to leakage or breakage of the cooling circuit. The mechanism is readily installed in existing equipment. It imposes no change in normal operating conditions. In the event of emergency, it operates without attention. When the system can again be operated, the by-pass can be promptly restored to normal either through the self-opening action of the spring or by a simple manipulation of an externally operated reset mechanism.

While the preferred form has been described for the purposes of illustration, many changes may be made in arrangement of parts, relative proportions and substitution of equivalents without departing from the invention as defined in the following claims.

What I claim is:

1. In a closed fluid conveying system, a supply tank, a work circuit, a pump for the system, a delivery pipe from the tank to the circuit, a valve device in said pipe, a first return pipe in the circuit to the valve device, a second return pipe from the valve device to the tank, said valve device having a free poppet with two opposed areas, one responsive to fluid pressure in the delivery pipe tending to close the valve, and the other area responsive to back pressure in the work circuit tending to open the valve, said poppet having two additional opposed areas, one responsive to pressure of fluid in the first return pipe tending to open the valve, and the other responsive to pressure of fluid in the second return pipe tending to close the valve.

2. In a closed fluid conveying system, a supply tank, a work circuit, a pump for the system, a delivery pipe from the tank to the circuit, a two-way valve in said pipe, a return pipe from the device to the valve and a common return pipe from the valve to the tank, said valve having a part controlling flow from the delivery pipe to the work circuit and a second part controlling flow from the delivery pipe to the common return, said valve having two areas, one responsive to fluid pressure in the delivery pipe tending to close the delivery pipe from the work circuit and open the delivery pipe to the common return, and the other area responsive to back fluid pressure into the work circuit tending to connect the delivery pipe to the work circuit and close the delivery pipe to the common return, said valve having two additional areas, one responsive to fluid pressure in the first return pipe tending to connect delivery pipe to the work circuit and close the delivery pipe to the common return, and the other area responsive to the pressure in the common return tending to close the delivery pipe to the work circuit and connect the first return pipe to the common return.

3. In a closed fluid conveying system, a supply tank, a work circuit, a pump for the system, a delivery pipe from the tank to the circuit, a valve in said pipe, a first return pipe from the circuit to the valve, a second return pipe from the valve to the tank, said valve directing flow from the delivery pipe to the circuit and from the circuit to the second return pipe, said valve operated by reduction of the pressure drop in the fluid flowing across the valve between the return pipe and second return pipe as compared with the pressure drop of the fluid across the valve between the delivery pipe and the work circuit to divert the flow in the delivery pipe to the second return pipe.

4. A flow responsive valve comprising valve housing means having a flow supply inlet port, an outlet port, a return port, and a supply return port, said housing having a cylindrical chamber communicating at one end with said inlet port, a valve seat member fitted at the opposite end, a poppet freely slidable in said chamber between said inlet and the valve seat and having an intermediate portion spaced from the wall of the chamber, spring means for holding the poppet normally away from said seat, said poppet having a valve head at one end and a longitudinal passageway and lateral ports therefrom registering with the supply return port when the valve head is seated.

5. A flow responsive valve comprising valve housing means having a flow supply inlet port, an outlet port, a return port and a supply return port, valve means within said housing means and having separate flow passageways from the inlet port to the outlet port and from the return port to the supply return port, means for holding the valve means normally open when the pressure drops of fluid flowing across the separate passageways are substantially the same, means whereby said valve means will close the connection of the inlet port to the outlet port upon reduction of the pressure drop across the passageway between the inlet and outlet ports as compared with the pressure drop across the passageway between the return and supply return ports.

6. A device such as defined in claim 5 having a mechanical actuator for opening the valve means.

7. A flow responsive valve comprising valve housing means having a flow supply inlet port, an outlet port, a return port, and a supply return port, said valve housing means having separate flow passageways from the inlet port to the outlet port and from the return port to the supply return port, valve means within said housing means and normally open when the pressure drop of fluid flowing through said passageway from the inlet port to the outlet port is less than the pressure drop of fluid flowing through the passageway from the return port to the supply return port, and means whereby said valve means will close when the pressure drop of fluid flowing through the passageway from the return port to the supply return port becomes less than that of the fluid flowing from the inlet port to the outlet port.

8. In combination, a valve having a generally cylindrical chamber with an inlet passageway at one end, said chamber having a bearing surface of reduced diameter adjacent the inlet, a lateral outlet from the chamber inwardly of the bearing surface, a closure for the opposite end of the chamber, said closure having an outlet, a valve seat and a bearing sleeve fitting in the side of the chamber, a hollow poppet journalled on the bearing sleeve and said reduced diameter, a valve head on one end of the poppet, said valve head being provided with peripheral outlet passageways, a series of laterally extending ports at the other end of the poppet, a peripheral apertured web on the poppet, a spring between the web and the bearing sleeve for holding the poppet ports opposite the reduced diameter, and a return passageway into the chamber at a point on the opposite side and separated from the lateral outlet by the web, said spring permitting the poppet to move into valve closing position with the laterally extending ports in registry with the lateral outlet and the valve seated when the pressure drop from the return passageway, across the web and to the lateral outlet is less than that across the valve seat.

9. A flow responsive valve comprising a valve casing having a flow supply end inlet port, an opposite outlet port, an intermediate return port, and a supply return port, all of said ports communicating with the interior of said casing, a hollow slide valve operable within said casing and in one end position communicating both internally between the inlet and outlet ports and separately externally between said return and supply return ports and in another position interrupting communication between the inlet and outlet ports, said valve being shifted from said first mentioned position to said second mentioned position by the establishment of a differential in the flow of fluid between said inlet and outlet ports when compared with the flow between said return and flow return ports.

10. A flow responsive valve comprising a valve casing having a flow supply end inlet port, an opposite outlet port, an intermediate return port, and a supply return port, all of said ports communicating with the interior of said casing, a hollow slide operable within said casing and in one end position communicating both internally between the inlet and outlet ports and separately externally between said return and supply return ports and in another position interrupting communication between the inlet and outlet ports, said valve being shifted from said first mentioned position to said second mentioned position by the establishment of a differential in the flow of fluid between said inlet and outlet ports when compared with the flow between said return and flow return ports, the shifting of said valve being independent of the pressure of the fluid passing through the valve.

11. A flow responsive valve comprising a valve casing having a flow supply end inlet port, an opposite outlet port, an intermediate return port, and a flow return port, all of said ports communicating with the interior of said casing, a hollow slide operable within said casing and in one end position communicating both internally between the inlet and outlet ports and separately externally between said return and supply return ports and in another position interrupting communication between the inlet and outlet ports, said valve being shifted from said first mentioned position to said second mentioned position by the establishment of a differential in the flow of fluid between said inlet and outlet ports when compared with the flow between said return and flow return ports and means for reopening the valve.

12. A flow responsive valve comprising a valve casing having a flow supply end inlet port, an opposite outlet port, an intermediate return port, and a flow return port, all of said ports communicating with the interior of said casing, a hollow slide operable within said casing and in one end position communicating both internally between the inlet and outlet ports and separately externally between said return and supply return ports and in another position interrupting communication between the inlet and outlet ports, said valve being shifted from said first mentioned position to said second mentioned position by the establishment of a differential in the flow of fluid between said inlet and outlet ports when compared with the flow between said return and flow return ports and automatic means for reopening the valve.

13. A flow responsive valve comprising a valve casing having a flow supply end inlet port, an opposite outlet port, an intermediate return port, and a flow return port, all of said ports communicating with the interior of said casing, a hollow slide operable within said casing and in one end position communicating both internally between the inlet and outlet ports and separately externally between said return and supply return ports and in another position interrupting communication between the inlet and outlet ports, said valve being shifted from said first mentioned position to said second mentioned position by the establishment of a differential in the flow of fluid between said inlet and outlet ports when compared with the flow between said return and flow return ports and externally operated means for reopening the valve.

14. A flow responsive valve comprising a valve casing having a flow supply end inlet port, an opposite outlet port, an intermediate return port, and a flow return port, all of said ports communicating with the interior of said casing, a hollow slide operable within said casing and in one end position communicating both internally between the inlet and outlet ports and separately externally between said return and flow return ports and in another position interrupting communication between the inlet and outlet ports, spring means urging the valve to open position, said valve means being automatically shiftable from said first mentioned position to said second mentioned position by the establishment of a differential in the flow of fluid between said inlet and outlet ports when compared with the flow between said return and flow return ports.

15. A flow responsive valve comprising a valve casing having a flow supply end inlet port, an opposite outlet port, an intermediate return port, and a supply return port, all of said ports communicating with the interior of said casing, a hollow slide operable within said casing and in one end position communicating both internally between the inlet and outlet ports and separately externally between said return and supply return ports and in another position interrupting communication between the inlet and outlet ports and establishing communication between the inlet and flow return ports, said valve being shifted from said first mentioned position to said second mentioned position by the establishment of a differential in the flow of fluid between said inlet and outlet ports when compared with the flow between said return and flow return ports.

ROBERT H. DAVIES.

REFERENCES CITED

The following references are of record in the file of this patent:

UNITED STATES PATENTS

| Number | Name | Date |
|---|---|---|
| 2,179,144 | Buttner | Nov. 7, 1939 |
| 2,189,814 | McNeal | Feb. 13, 1940 |
| 2,351,035 | Grant | June 3, 1944 |
| 2,357,321 | Fuller | Sept. 5, 1944 |
| 2,433,420 | Booth | Dec. 30, 1947 |
| 2,449,696 | Geddes | Sept. 21, 1948 |

FOREIGN PATENTS

| Number | Country | Date |
|---|---|---|
| 621,750 | France | of 1927 |